United States Patent
Akita et al.

(10) Patent No.: US 10,614,962 B2
(45) Date of Patent: Apr. 7, 2020

(54) PACKAGING MATERIAL FOR ELECTROCHEMICAL CELL

(71) Applicant: DAI NIPPON PRINTING CO., LTD., Tokyo (JP)

(72) Inventors: Hirohisa Akita, Fukuoka (JP); Makoto Amano, Fukuoka (JP); Kazuhiko Yokota, Fukuoka (JP); Rikiya Yamashita, Fukuoka (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 650 days.

(21) Appl. No.: 14/352,624

(22) PCT Filed: Oct. 22, 2012

(86) PCT No.: PCT/JP2012/077256
§ 371 (c)(1),
(2) Date: Apr. 17, 2014

(87) PCT Pub. No.: WO2013/061932
PCT Pub. Date: May 2, 2013

(65) Prior Publication Data
US 2014/0255765 A1 Sep. 11, 2014

(30) Foreign Application Priority Data
Oct. 25, 2011 (JP) .................................. 2011-233953
Oct. 5, 2012 (JP) .................................. 2012-223506

(51) Int. Cl.
*H01M 2/02* (2006.01)
*B32B 15/085* (2006.01)
(Continued)

(52) U.S. Cl.
CPC ................. *H01G 9/08* (2013.01); *B32B 7/12* (2013.01); *B32B 15/085* (2013.01);
(Continued)

(58) Field of Classification Search
CPC ..... B32B 15/085; B32B 15/088; B32B 15/09; B32B 15/20; B32B 2255/06;
(Continued)

(56) References Cited

U.S. PATENT DOCUMENTS 6,218,017 B1 * 4/2001 Yamashita ................ B32B 9/00
428/424.2
7,285,334 B1 * 10/2007 Yamashita .......... H01M 2/0267
428/220

(Continued)

FOREIGN PATENT DOCUMENTS

JP   A-2001-57181    2/2001
JP   A-2001-172779   6/2001
(Continued)

OTHER PUBLICATIONS

Machine translation for Tada et al. JP 2003-217529 A, published Jul. 2003 obtained from Espacenet.com.*
(Continued)

*Primary Examiner* — Carlos Barcena
(74) *Attorney, Agent, or Firm* — Oliff PLC

(57) ABSTRACT

Provided is a packaging material for an electrochemical cell which prevents the occurrence of short circuits. A packaging material for an electrochemical cell configured by laminating a base material layer including: at least a resin film; a heat-adhesive layer including a heat-adhesive resin, the heat-adhesive layer being disposed on the innermost layer; and a barrier layer including a metal foil, the barrier layer being disposed between the base material layer and the heat-adhesive layer, wherein a chemical-conversion-treated layer including alumina particles and modified epoxy resin is formed on the surface of at least the heat adhesive layer side of the barrier layer.

17 Claims, 7 Drawing Sheets

(51) Int. Cl.
*H01G 9/08* (2006.01)
*B32B 15/088* (2006.01)
*B32B 15/20* (2006.01)
*B32B 7/12* (2006.01)
*B32B 15/09* (2006.01)
*H01G 11/78* (2013.01)
*H01M 10/052* (2010.01)

(52) U.S. Cl.
CPC ............ *B32B 15/088* (2013.01); *B32B 15/09* (2013.01); *B32B 15/20* (2013.01); *H01G 11/78* (2013.01); *H01M 2/029* (2013.01); *H01M 2/0275* (2013.01); *H01M 2/0282* (2013.01); *H01M 2/0287* (2013.01); *H01M 2/0292* (2013.01); *H01M 2/0295* (2013.01); *B32B 2255/06* (2013.01); *B32B 2255/26* (2013.01); *B32B 2264/102* (2013.01); *B32B 2307/206* (2013.01); *B32B 2307/31* (2013.01); *B32B 2307/514* (2013.01); *B32B 2307/558* (2013.01); *B32B 2307/7246* (2013.01); *B32B 2439/62* (2013.01); *B32B 2457/10* (2013.01); *H01M 10/052* (2013.01)

(58) Field of Classification Search
CPC .......... B32B 2255/26; B32B 2264/102; B32B 2307/206; B32B 2307/31; B32B 2307/514; B32B 2307/558; B32B 2307/7246; B32B 2439/62; B32B 2457/10; B32B 7/12; H01M 2/0282; H01M 10/052; H01M 2/0275; H01M 2/0287; H01M 2/029; H01M 2/0292; H01M 2/0295
See application file for complete search history.

(56) References Cited

U.S. PATENT DOCUMENTS

| | | | |
|---|---|---|---|
| 2002/0142178 | A1 | 10/2002 | Yamashita et al. |
| 2006/0135710 | A1* | 6/2006 | Shirrell ............... C08G 59/621 |
| | | | 525/481 |
| 2006/0172191 | A1 | 8/2006 | Yamashita et al. |
| 2012/0034477 | A1 | 2/2012 | Yamashita et al. |
| 2012/0258353 | A1 | 10/2012 | Yamashita et al. |

FOREIGN PATENT DOCUMENTS

| | | |
|---|---|---|
| JP | A-2001-176462 | 6/2001 |
| JP | A-2001-202927 | 7/2001 |
| JP | A-2003-217529 | 7/2003 |
| JP | 2004-234995 A | 8/2004 |
| JP | 2007-157615 A | 6/2007 |
| JP | A-2007-273398 | 10/2007 |
| JP | 2009-087628 A | 4/2009 |
| JP | 2009-231164 A | 10/2009 |
| JP | 2010-086831 A | 4/2010 |
| JP | 2011-216358 A | 10/2011 |
| KR | 20100071798 A | 6/2010 |
| WO | WO 2007/060910 A1 | 5/2007 |

OTHER PUBLICATIONS

Machine translation of Nishida et al. JP 2010-086831 A, obtained from JPO website.*
Translation of International Search Report issued in International Application No. PCT/JP2012/077256 dated Jan. 15, 2013.

* cited by examiner

PACKAGING MATERIAL FOR
ELECTROCHEMICAL CELL

TECHNICAL FIELD

The present invention relates to an electrochemical cell packaging material for forming a packaging member for an electrochemical cell.

BACKGROUND ART

A conventional electrochemical cell packaging material is disclosed in Patent Document 1 listed below. This packaging material is a laminated material composed of a base material layer, a barrier layer formed of a metal foil, and a thermally adhesive layer as the innermost layer which are laminated successively. Putting the thermally adhesive layer against another and heat-sealing them together at a thermally adhesive portion around the periphery produces a packaging member for an electrochemical cell. The packaging member encloses a space for housing an electrochemical cell module, and electrode tabs coupled to cathode and anode charge collecting members of the electrochemical cell module extend out while being held by the packaging member in the thermally adhesive portion.

Lithium-ion cells have an electrolyte in the form of liquid, gel, or macromolecule polymer, and include those in which cathode and anode active materials are macromolecule polymers. Cathode and anode active materials are deposited on cathode and anode charge collectors respectively. Used for a cathode charge collector is, for example, aluminum or nickel. Used for an anode charge collector is, for example, copper, nickel, or stainless steel. Used as a cathode active material is, for example, a metal oxide, carbon black, a metal sulfide, an electrolyte liquid, or a macromolecule cathode material such as polyacrylonitrile. Used as an anode active material is, for example, metal lithium, an alloy, carbon, an electrolyte liquid, or a macromolecule anode material such as polyacrylonitrile.

LIST OF CITATIONS

Patent Literature

Patent Document 1: Japanese Patent Application Publication No. 2007-273398

SUMMARY OF THE INVENTION

Problem to be Solved by the Invention

Inconveniently, however, with the packaging material mentioned above, in the cell manufacturing process, if an electrode active material peels off or scatters, or fine metal foreign matter such as a broken fragment of an electrode tab enters, and the electrode active material or metal foreign matter adheres to the surface of a thermally adhesive layer arranged on the inner surface of the packaging material, the thermally adhesive layer becomes thin by melting under heat and pressure during heat-sealing, and the electrode active material or metal foreign matter bites into the thermally adhesive layer in the portion holding the electrode tab, causing short-circuiting between the electrode tab and the barrier layer. Also inconveniently, if an electrode tab has a burr, it penetrates the thermally adhesive layer and reaches the barrier layer, causing short-circuiting.

In view of the inconveniences mentioned above, an object of the present invention is to provide an electrochemical cell packaging material that prevents short-circuiting.

Means for Solving the Problem

To achieve the above object, according to the present invention, an electrochemical cell packaging material includes, as layers laminated together, at least: a base material layer formed of a resin film; a thermally adhesive layer arranged as an innermost layer and formed of a thermally adhesive resin; and a barrier layer arranged between the base material layer and the thermally adhesive layer and formed of a metal foil. Moreover, a chemical conversion treatment layer containing alumina particles and a modified epoxy resin is formed at least on a surface of the barrier layer facing the thermally adhesive layer.

With this structure, the alumina particles and modified epoxy resin contained in the chemical conversion treatment layer have electrical insulation, and are unlikely to melt or yield under heat and pressure during heat-sealing. Thus, even if a burr, carbon, or fine metal foreign matter bites into the thermally adhesive layer during heat-sealing, the burr, carbon, or fine metal foreign matter is prevented by the chemical conversion treatment layer from reaching the metal foil of the barrier layer. Thus, it is possible to prevent short-circuiting between an electrode tab and the barrier layer. Moreover, the chemical conversion treatment layer gives the barrier layer improved adhesion (wettability) on the surface as well as corrosion resistance against electrolyte liquid.

According to the present invention, in the electrochemical cell packaging material structured as described above, on the chemical conversion treatment layer formed on the surface of the barrier layer facing the thermally adhesive layer, an insulating layer containing a modified epoxy resin is laminated. With this structure, laminating the insulating layer on the chemical conversion treatment layer further improves electrical insulation as an electrochemical cell packaging material.

According to the present invention, in the electrochemical cell packaging material structured as described above, the insulating layer has a thickness of 0.5 μm or more but 5 μm or less. With this structure, it is possible, while securing sufficient electrical insulation, to stably maintain the lamination strength between the barrier layer and the thermally adhesive layer.

According to the present invention, in the electrochemical cell packaging material structured as described above, the thickness of the insulating layer is greater than the particle diameter of the alumina particles.

According to the present invention, an electrochemical cell packaging material includes, as layers laminated together, at least: a base material layer formed of a resin film; a thermally adhesive layer arranged as an innermost layer and formed of a thermally adhesive resin; and a barrier layer arranged between the base material layer and the thermally adhesive layer and formed of a metal foil. Moreover, an insulating layer formed by stacking a plurality of metal oxide microparticles in three or more layers is provided on a surface of the barrier layer facing the thermally adhesive layer. Furthermore, the metal oxide microparticles has an average particle diameter of 0.7 μm or less, and when the thickness of the insulating layer is represented by X (μm) and the average particle diameter of the metal oxide microparticles is represented by Y (μm), then formula (1) below is fulfilled:

[Formula 1]

$$\frac{X}{Y} > 2.5 \qquad (1)$$

With this structure, the metal oxide microparticles are a material excellent in heat resistance, firm, and highly insulating, and are unlikely to melt or yield under heat or pressure during heat-sealing. Thus, also the insulating layer formed by stacking the metal oxide microparticles in three or more layers is excellent in heat resistance and electrical insulation. Accordingly, in a case where an electrode tab has a burr, or electrode active material or fine-particle metal foreign matter has adhered to the inner surface of the thermally adhesive layer, even if the burr, electrode active material, or fine-particle metal foreign matter bites into the thermally adhesive layer, such foreign matter is hampered by the insulating layer having the metal oxide microparticles stacked on it, and is unlikely to reach the metal foil of the barrier layer. Thus, deterioration of electrical insulation is prevented.

According to the present invention, in the electrochemical cell packaging material structured as described above, the insulating layer is formed by applying a treatment liquid having the metal oxide microparticles dispersed in a binder solution.

According to the present invention, in the electrochemical cell packaging material structured as described above, the binder solution contains phosphoric acid. With this structure, the insulating layer has improved adhesion to the neighboring resin.

According to the present invention, in the electrochemical cell packaging material structured as described above, the insulating layer has a thickness of 2 μm or less.

According to the present invention, in the electrochemical cell packaging material structured as described above, chromium-based or non-chromium-based chemical conversion treatment is applied to the surface of the insulating layer facing the thermally adhesive layer. With this structure, the insulating layer has further improved corrosion resistance and adhesion.

Advantageous Effects of the Invention

According to the present invention, the alumina particles and modified epoxy resin contained in the chemical conversion treatment layer have electrical insulation, and are unlikely to melt or yield under heat and pressure during heat-sealing. Thus, even if a burr, carbon, or fine metal foreign matter bites into the thermally adhesive layer during heat-sealing, the burr, carbon, or fine metal foreign matter is prevented by the chemical conversion treatment layer from reaching the metal foil of the barrier layer. Thus, even when heat-sealing is performed with a burred electrode tab interposed or with electrode active material or fine metal foreign matter biting in, the metal foil of the barrier layer is protected by the chemical conversion treatment layer, and thus short-circuiting between the electrode tab and the barrier layer is prevented.

Moreover, according to the present invention, the metal oxide microparticles are a material excellent in heat resistance, firm, and highly insulating, and are unlikely to melt or yield under heat or pressure during heat-sealing. Thus, in a case where an electrode tab has a burr, or electrode active material or metal foreign matter has splashed onto or otherwise reached and adhered to the inner surface of the thermally adhesive layer, even if the burr, electrode active material, or fine-particle metal foreign matter bites into the thermally adhesive layer, such foreign matter is hampered by the insulating layer having the metal oxide microparticles stacked on it, and is unlikely to reach the metal foil of the barrier layer. Thus, deterioration of electrical insulation is prevented. This prevents short-circuiting between the electrode tab and the barrier layer. Moreover, the insulating layer is formed by stacking metal oxide microparticles with an average particle diameter of 0.7 μm or less such that, let the thickness of the insulating layer be X (μm), and let the average particle diameter of the metal oxide microparticles be Y (μm), formula (1) below. This keeps small the gaps left between neighboring metal oxide microparticles, and helps increase the volume occupation factor of the metal oxide microparticles contained in the insulating layer. It is thus possible to further improve the electrical insulation of the insulating layer.

[Formula 1]

$$\frac{X}{Y} > 2.5 \qquad (1)$$

DESCRIPTION OF EMBODIMENTS

First Embodiment

Figure 1:
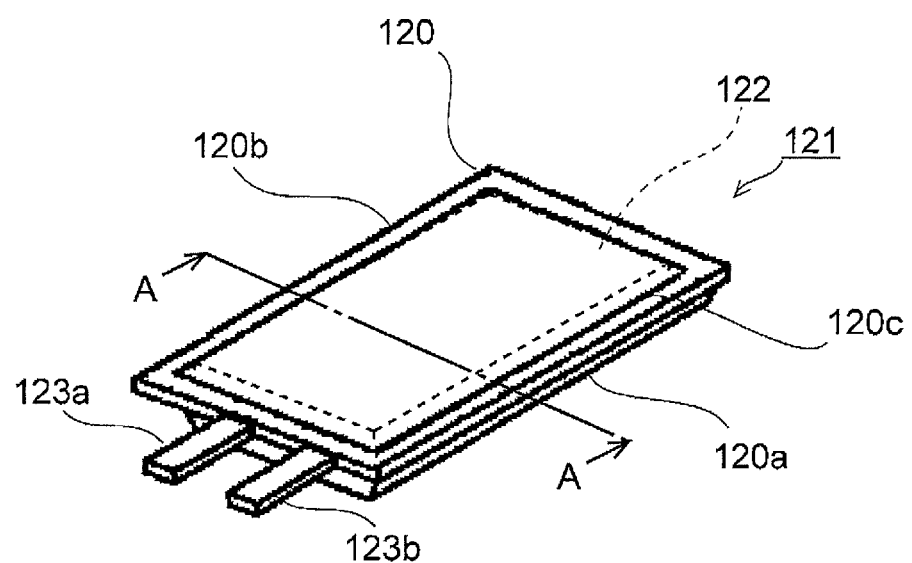
FIG. 1 is a perspective view of a lithium-ion cell according to a first embodiment of the present invention.
Figure 2:
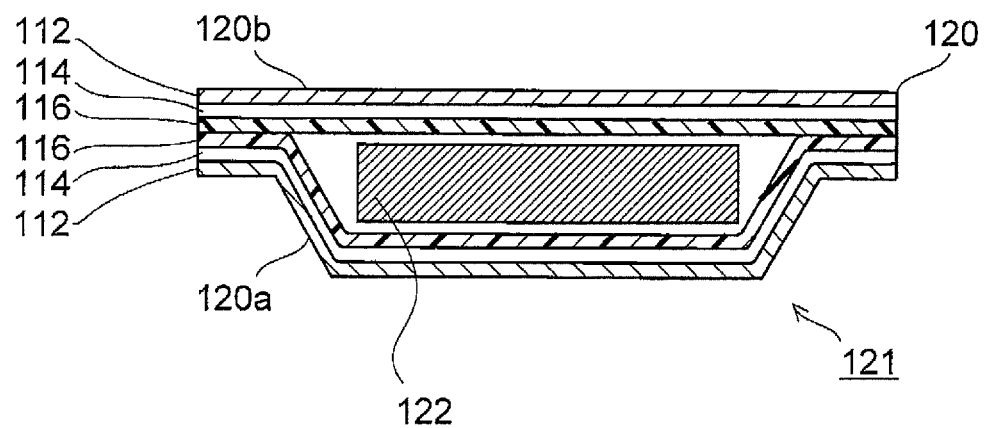
FIG. 2 is a sectional view along line A-A in FIG. 1.

Hereinafter, with reference to the accompanying drawings, an electrochemical cell packaging material 110 according to a first embodiment of the present invention will be described. FIG. 1 is a perspective view of a lithium-ion cell 121 according to the first embodiment, and FIG. 2 is a sectional view along line A-A in FIG. 1.

The lithium-ion cell 121 is composed of a lithium-ion cell module 122 containing electrolyte liquid housed inside a packaging member 120. The packaging member 120 is composed of a housing portion 120a in which the lithium-ion cell module 122 is housed, and a lid portion 120b which covers the housing portion 120a.

The packaging member 120 has the housing portion 120a and the lid portion 120b thermobonded together at a thermally adhesive portion 120c at which they overlap each other, so as to have a sealed interior. Here, a cathode tab 123a and an anode tab 123b which are coupled to the lithium-ion cell module 122 extend out through the thermally adhesive portion 120 while being held between the housing portion 120a and the lid portion 120b with a tab film (not illustrated) interposed.

The lithium-ion cell module 122 is composed of a cell which includes: a cathode (positive electrode), which is composed of a cathode active material and a cathode charge collector; an anode (negative electrode), which is composed of an anode active material and an anode charge collector; and electrolyte liquid which fills between the cathode and the anode. The cell is composed of a plurality of cathode plates, from which cathode charge collectors extend, and a plurality of anode plates, from which anode charge collectors extend, laminated on one another. The plurality of cathode plates and the plurality of anode plates are laminated alternately with separators interposed. The plurality of cathode and anode charge collectors thus laminated lie over one another to be coupled to one cathode tab 123a and one anode tab 123b respectively.

Figure 3:
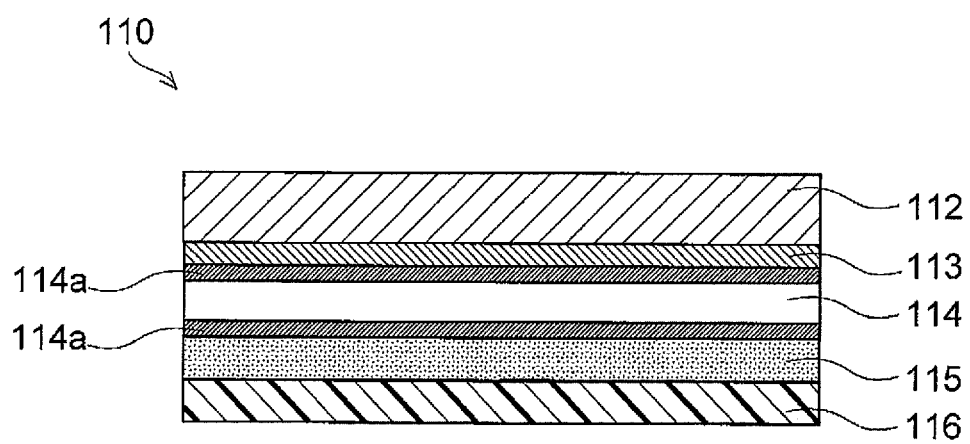
FIG. 3 is a schematic sectional view showing a layer structure of a packaging material according to the first embodiment of the present invention.

FIG. 3 is a schematic sectional view showing the layer structure of a packaging material 110 that forms the housing portion 120a and the lid portion 120b. The packaging material 110 is composed of a base material layer 112, a barrier layer 114, and a thermally adhesive layer 116 laminated successively. The base material layer 112 and the barrier layer 114 are bonded together with an adhesive layer 113 interposed, and the barrier layer 114 and the thermally adhesive layer 116 are bonded together with an acid-modified polyolefin layer 115 interposed. Chemical conversion treatment is applied to both surfaces of the barrier layer 114 to increase the lamination strength between the barrier layer 114 and the acid-modified polyolefin layer 115 and between the barrier layer 114 and the adhesive layer 113.

As shown in FIG. 2, the housing portion 120a is fabricated by press-forming a piece of the packaging material 110 cut in a rectangular shape. The fabrication procedure proceeds as follows: the packaging material 110 is placed on a concave mold; the packaging material 110 is then, from its thermally adhesive layer 116 side, cold-formed to have a predetermined forming depth using a convex mold. The housing portion 120a and the lid portion 120b are thermobonded together at their respective, mutually facing, thermally adhesive layers 116.

The base material layer 112 is formed of a resin film, and gives the packaging member 120 high pierce resistance (pinhole resistance), electrical insulation, handleability, etc.; it needs to have sufficient malleability to withstand pressing for embossing.

For the base material layer 112, any arbitrarily selected film of resin such as drawn polyester or drawn polyamide may be used. Examples of polyester resins include polyethylene terephthalate, polybutylene terephtharate, polyethylene naphthalate, polybutylene naphthalate, copolymerized polyester, and polycarbonate. Examples of nylon resins include polyamide resins, that is, nylon 6, nylon 6.6, copolymer of nylon 6 and nylon 6.6, nylon 6.10, and poly-metaxylylene adipamide (MXD6).

The barrier layer 114 is formed of a metal foil, and has chemical conversion treatment layers 114a formed one on each surface. The barrier layer 114 prevents permeation of water vapor from outside into the lithium-ion cell 121. Moreover, to stabilize pinholes in, and the forming suitability (with respect to pouching and embossing) of, the barrier layer 114 itself, and to give it pinhole resistance, aluminum with a thickness of 15 μm or more is used.

In a case where the packaging member 120 is embossed, it is preferable that the material for the barrier layer 114 be aluminum containing 0.3% to 9.0% by weight of iron, more preferably 0.7% to 2.0% by weight of iron.

Compared with aluminum containing no iron, aluminum then has good malleability and develops less pinholes when bent as the packaging member 120. Moreover, when the packaging material 110 is embossed, a side wall can easily be formed. Incidentally, aluminum containing less than 0.3% by weight of iron provides no effect of preventing pinhole development, improving embossing suitability, etc. Aluminum containing more than 9.0% by weight of iron has impaired flexibility as aluminum and exhibits poor pouchability as a packaging material.

The aluminum used as the barrier layer 114 changes its flexibility, firmness, and hardness depending on the conditions of annealing. For the barrier layer 114, aluminum of a soft type that is annealed is preferable to aluminum of a hard type that is not annealed.

The chemical conversion treatment layers 114a are formed by applying a treatment liquid containing alumina and modified epoxy resin in a predetermined thickness. Here, the alumina particles and modified epoxy resin contained in the chemical conversion treatment layers 114a have electrical insulation, and are unlikely to melt or yield under heat and pressure during heat-sealing. Thus, even if a burr, carbon, or fine-particle metal foreign matter bites into the thermally adhesive layer 116 during heat-sealing, the burr, carbon, or fine-particle metal foreign matter is prevented by the chemical conversion treatment layers 114a from reaching the metal foil of the thermally adhesive layer 116. Thus, it is possible to prevent short-circuiting between the cathode tab 123a or the anode tab 123b and the barrier layer 114.

The chemical conversion treatment layers 114a also improve adhesion (wettability) on the aluminum surface. The chemical conversion treatment layers 114a further give the aluminum surface resistance to corrosion. Thus, it is possible to prevent the aluminum surface from being dissolved and corroded by hydrogen fluoride produced by reaction between electrolyte liquid and moisture. In particular, it is possible to prevent dissolution and corrosion of aluminum oxide present at the surface of aluminum. In this way, it is possible to prevent delamination between the barrier layer 114 and the thermally adhesive layer 116 and delamination between the barrier layer 114 and the base material layer 112.

The chemical conversion treatment layers 114a are formed in the form of a coating, by applying a treatment liquid containing alumina particles and modified epoxy resin to the surface of aluminum and then baking it. The chemical conversion treatment is performed by applying the treatment liquid by an application method selected from well-known ones, such as bar-coating, roll-coating, gravure-coating, and immersion. Application-type chemical conversion treatment allows continuous treatment, requires no process of washing with water, and reduces treatment cost.

Before the chemical conversion treatment is applied, it is preferable to perform, beforehand, degreasing treatment on the surface of the barrier layer 114 by a well-known degreasing method, such as alkali immersion, electrolytic washing, acid washing, or acid activation. This maximizes the function of chemical conversion treatment, and allows the function to last for a long period.

The treatment liquid for the chemical conversion treatment is a binder solution of modified epoxy resin and alumina particles, and phosphoric acid may be mixed in the binder solution. Instead of a binder solution of modified epoxy resin alone, a mixture liquid of modified epoxy resin and aminated phenol polymer in a ratio of 1:1 may instead be used for the same effect.

Alumina particles increase the electrical insulation of the chemical conversion treatment layers 114a, and for the alumina particles, particles of the order of nanometers in size are suitably used. It is preferable to use, as the alumina particles, particles with an average particle diameter of 0.03 µm to 3.0 µm, and more preferably 0.10 µm to 1.0 µm. With an average diameter more than 3.0 µm, alumina particles are not dispersed evenly, and thus the chemical conversion treatment layers 114a may be formed unevenly. On the other hand, with an average particle diameter less than 0.03 µm, the amount of alumina particles to be added to the binder solution needs to be increased, and this leads to reduced lamination strength between the barrier layer 114 and the acid-modified polyolefin layer 115 and between the barrier layer 114 and the adhesive layer 113, and to increased manufacturing cost.

Other than alumina particles, particles of a ceramic material or a metal oxide may be used to give electrical isolation to the chemical conversion treatment layers 114a. Examples of particles of ceramic materials include particles of aluminum phosphate monobasic and of aluminum nitride. Examples of metal oxide materials include zirconium oxide and titanium oxide.

As the modified epoxy resin for use in the treatment liquid of the chemical conversion treatment layers 114a, a modified product of an epoxy resin having bisphenol A or bisphenol F as skeletal units. Examples of modified products of epoxy resin include silane-modified products in which part or all of the glycidyl groups in epoxy resin are silane-modified, and phosphoric acid-modified products in which part or all of the glycidyl groups in epoxy resin are phosphoric acid-modified. When formed of such a modified epoxy resin, the chemical conversion treatment layers 114a provide excellent electrical insulation.

One example of an epoxy resin having bisphenol A or bisphenol F as skeletal units is a resin obtained through repetition of a dehydrochlorination reaction and an addition reaction between epichlorohydrin and bisphenol A or bisphenol F. Another example is a resin obtained through repetition of an addition reaction between an epoxy compound having two or more, preferably two, glycidyl groups and bisphenol A or bisphenol F.

Here, examples of epoxy compounds include sorbitol polyglycidyl ether, polyglycerol polyglycidyl ether, pentaerythritol polyglycidyl ether, diglycerol polyglycidyl ether, trimethylolpropylene polyglycidyl ether, polyethylene glycol diglycidyl ether, and polypropylene glycol diglycidyl ether.

The silane-modified product of an epoxy resin having bisphenol A or bisphenol F as skeletal units may be one that has been silane-modified by use of a silane coupling agent at the stage of synthesis. There is no particular restriction on the kind of silane coupling agent used to silane-modify the epoxy resin or the amount of modification. Silane-modifying the epoxy resin leads to closer contact between the barrier layer 114 and the thermally adhesive layer 116, and to improved resistance of the barrier layer 114 to corrosion by electrolyte liquid.

Examples of silane-coupling agents include vinyltrichlorosilane, vinyltris(2-methoxyethoxy)silane, vinyltriethoxysilane, vinyltrimethoxysilane, 3-methacryloyloxypropyltrimethoxysilane, 2-(3,4-epoxycyclohexyl)ethyltrimethoxysilane, 3-glycidoxypropyltrimethoxysilane, 3-glycidoxypropyltriethoxysilane, 3-glycidoxypropyldiethoxysilane, N-(2-aminoethyl)-3-aminopropyltrimethoxysilane, N-(2-aminoethyl)-3-aminopropyldimethoxysilane, 3-aminopropyltrimethoxysilane, 3-aminopropyltriethoxysilane, N-phenyl-3-aminopropyltrimethoxysilane, 3-mercaptopropyltrimethoxysilane, 3-chloropropyltrimethoxysilane, and ureidopropyltriethoxysilane.

Phosphoric-acid modification of an epoxy resin having bisphenol A or bisphenol F as skeletal units is achieved through reaction of an epoxy resin with a phosphoric acid or an ester of a phosphoric acid. As a phosphoric acid, it is possible to use, for example, metaphosphoric acid, phosphonic acid, orthophosphoric acid, or pyrophosphoric acid. As a phosphoric acid ester, it is possible to use, for example, a monoester of metaphosphoric acid, phosphonic acid, orthophosphoric acid, or pyrophosphoric acid, examples including monomethyl phosphate, monooctyl phosphate, and monophenyl phosphate.

It is preferable that the phosphoric acid-modified product of an epoxy resin be neutralized, because when neutralized with an amine-based compound, it produces a stabler water-dispersed resin composition. Examples of amine-based compounds include: ammonia; alcanolamines such as dimethanolamine and triethanolamine; alkylamines such as diethylamine and triethylamine; and alkylalcanolamines such as dimethylethanolamine.

There is no restriction on the degree of modification with silane or with a phosphoric acid so long as it is equal to or higher than the level at which the modification produces a notable effect. Typically, it is preferable that the modification be performed such that the Si—OH equivalent or the P—OH group equivalent is in the range of 150 to 1,000, more preferably in the range of 300 to 800.

There is no particular restriction on the epoxy equivalent of the epoxy resin (the chemical formula weight of the epoxy resin per epoxy group, that is, the value obtained by dividing the molecular mass of the epoxy resin by the number of epoxy groups contained in the epoxy resin); however, it is preferable that the epoxy equivalent fall within the range from 100 to 3,000.

The thermally adhesive layer 116 is arranged as the innermost layer of the packaging material 110, and is formed of a thermally adhesive resin which melts under heat to fuse together mutually facing packaging materials 110. Moreover, depending on whether or not a tab film is interposed between the thermally adhesive layer 116 and the cathode tab 123a or the anode tab 123b, different species of resin are used. In a case where a tab film is interposed, a film of olefin resin alone or a mixture thereof or the like can be used. In a case where no tab film is interposed, a film of acid-modified olefin resin graft-modified with an unsaturated carboxylic acid can be used.

For the thermally adhesive layer 116, polypropylene is suitably used; instead, it is possible to use a film formed of a single layer or multiple layers of linear low-density polyethylene or middle-density polyethylene, or a single layer or multiple layers of a blended resin of linear low-density polyethylene and middle-density polyethylene.

Any type of polypropylene can be used, examples including random propylene, homopropylene, and block propylene. To linear low-density polyethylene and middle-density polyethylene, low-crystalline ethylene-butene copolymer, low-crystalline propylene-butene copolymer, or terpolymer of three-component, namely ethylene-butene-propylene, copolymer, may be added. To these resins, an antiblocking agent (AB agent) such as silica, zeolite, or acrylic resin beads and a slipping agent based on an aliphatic acid amide may be added.

The acid-modified polyolefin layer 115 is a resin layer which stably bonds together the barrier layer 114 and the thermally adhesive layer 116, and acid-modified polypropylene is suitably used for it. The acid-modified polyolefin layer 115 needs to be selected to suit the species of resin used for the thermally adhesive layer 116.

Accordingly, examples include, in a case where acid-modified polyolefin resin other than acid-modified polypropylene is used, polyolefin resin graft-modified with an unsaturated carboxylic acid, ethylene-acrylic acid copolymer graft-modified with an unsaturated carboxylic acid, propylene-acrylic acid copolymer graft-modified with an unsaturated carboxylic acid, ethylene-methacrylic acid copolymer graft-modified with an unsaturated carboxylic acid, propylene-methacrylic acid copolymer graft-modified with an unsaturated carboxylic acid, and metal-linked polyolefin resin graft-modified with an unsaturated carboxylic acid.

Any of these resins may have, as necessary, 5% or more of a butene component, ethylene-propylene-butene copolymer, amorphous ethylene-propylene copolymer, propylene-α-olefin copolymer, or the like added to it.

In a case where acid-modified polypropylene is used, it is possible to use—
(1) a homotype with a Vicat softening point of 115° C. or more and a melting point of 150° C. or more;
(2) ethylene-propylene copolymer with a Vicat softening point of 105° C. or more and a melting point of 130° C. or more (a random copolymer type); or
(3) a substance, alone or a blend thereof, acid-modified using an unsaturated carboxylic acid with a melting point of 110° C. or more.

The adhesive layer 113 is a resin layer which firmly bonds together the base material layer 112 and the barrier layer 114. The bonding between these layers is achieved by a method such as dry lamination, extrusion lamination, co-extrusion lamination, or heat lamination.

In a case where the bonding is achieved by dry lamination, it is possible to use an adhesive based on polyester, polyethylene imine, polyether, cyanoacrylate, urethane, organic titanium, polyether urethane, epoxy, polyester urethane, imide, isocyalate, polyolefin, or silicone.

According to this embodiment, the alumina particles and modified epoxy resin contained in the chemical conversion treatment layers 114a have electrical insulation, and are unlikely to melt or yield under heat and pressure during heat-sealing. Thus, even if a burr, carbon, or fine-particle metal foreign matter bites into the thermally adhesive layer 116 during heat-sealing, the burr, carbon, or fine-particle metal foreign matter is prevented by the chemical conversion treatment layers 114a from reaching the metal foil of the thermally adhesive layer 116. Thus, it is possible to prevent short-circuiting between the cathode tab 123a or the anode tab 123b and the barrier layer 114.

In this embodiment, between adjacent ones of the above-mentioned layers, a different layer may be interposed. Although a lithium-ion cell 121 has been dealt with above, any electrochemical cell module other than a lithium-ion cell module 122 may be packaged in the packaging member 120 formed of the packaging material 110 to fabricate an electrochemical cell other than a lithium-ion cell 121.

For example, electrochemical cells include, other than lithium-ion cells, chemical cells such as nickel-hydride cells, nickel-cadmium cells, lithium-metal primary and secondary cells, and lithium-polymer cells, electric double-layer capacitors, capacitors, and electrolytic capacitor. Here, an electrochemical cell module includes all electrical device elements that generate electric power, namely a cell (electric power storage portion) including a cathode composed of a cathode active material and a cathode charge collector, an anode composed of an anode active material and an anode charge collector, and electrolyte liquid which fills between the cathode and the anode, electrode terminals coupled to the cathode and the anode inside the cell, etc.

Second Embodiment

Figure 4:
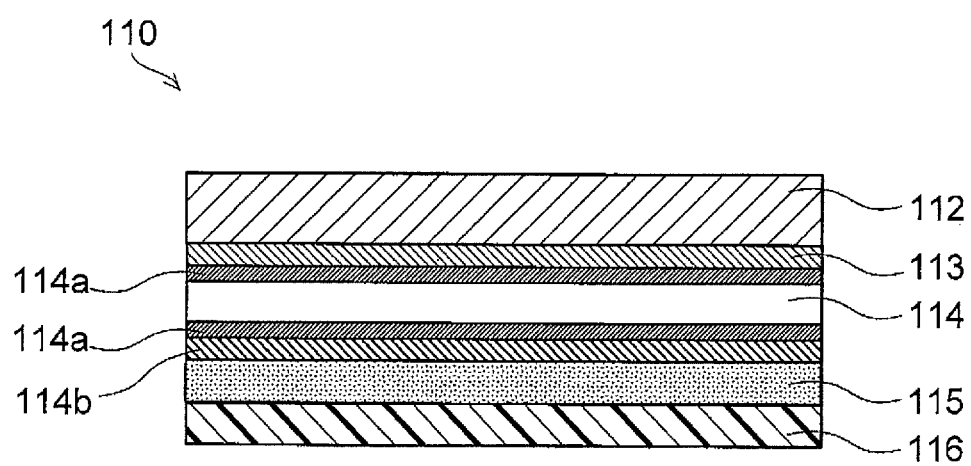
FIG. 4 is a schematic sectional view showing a layer structure of a packaging material according to a second embodiment of the present invention.

FIG. 4 is a sectional view showing a packaging material 110 according to a second embodiment of the present invention. For the sake of convenience of description, such features as find their counterparts in the first embodiment shown in FIGS. 1 to 3 described above are identified by common reference signs. In the packaging material 110 according to this embodiment, on the thermally adhesive layer 116-side chemical conversion treatment layer 114a, an insulating layer 114b containing a modified epoxy resin is laminated. As the modified epoxy resin for the insulating layer 114b, the modified epoxy resin contained in the chemical conversion treatment layer 114a in the first embodiment can be used.

According to this embodiment, laminating the insulating layer 114b containing a modified epoxy resin on the thermally adhesive layer 116-side chemical conversion treatment layer 114a further improves electrical insulation as an electrochemical cell packaging material. Thus, even if a burr, carbon, or fine-particle metal foreign matter lodges between the aluminum of the barrier layer 114 and the cathode tab 123a or the anode tab 123b, the burr, carbon, or fine-particle metal foreign matter is prevented by the insulating layer 114b and the chemical conversion treatment layer 114a from reaching the metal foil of the thermally adhesive layer 116. Thus, it is possible to prevent short-circuiting between the cathode tab 123a or the anode tab 123b and the barrier layer 114.

Incidentally, the two-layer structure of the chemical conversion treatment layer 114a and the insulating layer 114b, as compared with a structure where the chemical conversion treatment layer 114a alone is formed as thick, helps suppress a lowering in the lamination strength between the barrier layer 114 and the acid-modified polyolefin layer 115.

It is preferable that the insulating layer 114b have a thickness of 0.5 μm or more but 5 μm or less. With a thickness less than 0.5 μm, the insulating layer 114b does not provide sufficient electrical insulation. With a thickness more than 5 μm, lower lamination strength between the barrier layer 114 and the acid-modified polyolefin layer 115 results. Moreover, it is preferable that the thickness of the insulating layer 114b be greater than the particle diameter of the alumina particles contained in the chemical conversion treatment layers 114a.

Third Embodiment

Figure 5:
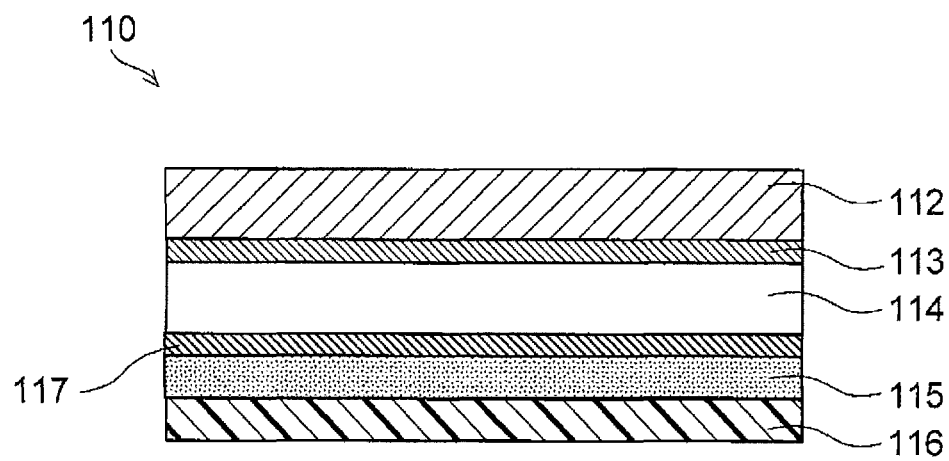
FIG. 5 is a schematic sectional view showing a layer structure of an electrochemical cell packaging material according to a third embodiment of the present invention.

FIG. 5 is a sectional view showing a packaging material 110 according to a third embodiment of the present invention. For the sake of convenience of description, such features as find their counterparts in the first embodiment shown in FIGS. 1 to 3 described above are identified by common reference signs. In the packaging material 110 according to this embodiment, on the thermally adhesive layer 116 side of the barrier layer 114, instead of a chemical conversion treatment layer 114a, an insulating layer 117 containing metal oxide microparticles 111 is laminated.

Figure 6:
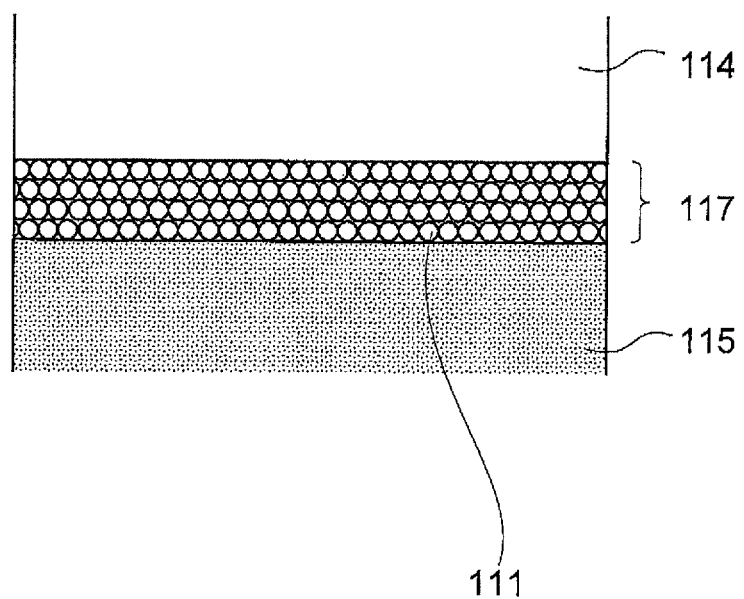
FIG. 6 is a schematic sectional view showing, on an enlarged scale, an insulating layer in the electrochemical cell packaging material according to the third embodiment of the present invention.

FIG. 6 is a sectional view schematically showing the insulating layer 117. As shown in FIG. 6, the insulating layer 117 has a predetermined thickness, and is formed by stacking the metal oxide microparticles 111 in three or more layers. The metal oxide microparticles 111 are a material excellent in heat resistance, firm, and highly insulating, and are unlikely to melt or yield under heat or pressure during heat-sealing. Thus, in a case where the cathode tab 123a or the anode tab 123b has a burr, or electrode active material or fine-particle metal foreign matter has splashed onto or otherwise reached and adhered to the inner surface of the thermally adhesive layer 116, even if the burr, electrode active material, or fine-particle metal foreign matter bites into the thermally adhesive layer 116, such foreign matter is hampered by the insulating layer 117 having the metal oxide microparticles 111 stacked on it, and is unlikely to reach the metal foil of the barrier layer 114. Thus, deterioration of electrical insulation is prevented. In this way, it is possible to prevent short-circuiting between the cathode tab 123a or anode tab 123b and the barrier layer 114 via the lithium-ion cell module 122 including the electrolyte liquid inside the packaging member 120.

As the metal oxide microparticles 111, it is preferable to use particles with an average particle diameter of 0.01 μm or more but 0.7 μm or less. This keeps small the gaps left between neighboring metal oxide microparticles 111, and helps increase the volume occupation factor of the metal oxide microparticles 111 contained in the insulating layer 117. It is thus possible to further improve the electrical insulation of the insulating layer 117.

Using spherical metal oxide microparticles 111 makes it easy to stack the metal oxide microparticles 111 on the top surface of the barrier layer 114. The particles, however, may contain, other than spherical particles, non-spherical particles such as plate-shaped and needle-shaped particles.

It is preferable that the thickness of the insulating layer be 2 μm or less. Giving the insulating layer 117 a thickness of 2 μm or less helps obtain sufficient formability. An insulating layer 117 with a thickness more than 2 μm makes the packaging material 110 hard, and makes pinholes more likely to develop during forming.

Let the thickness of the insulating layer 117 be X (μm), and let the average particle diameter of the metal oxide microparticles 111 be Y (μm). Then, by fulfilling formula (1) below, it is possible to further improve the electrical insulation of the insulating layer 117.

[Formula 1]

$$\frac{X}{Y} > 2.5 \quad (1)$$

In the present invention, the average particle diameter Y (μm) denotes the average of diameters (sphere-equivalent particle diameters) when the metal oxide microparticles 111 are converted to spheres of the same volumes. The average particle diameter of the metal oxide microparticles 111 can be measured on a laser-diffraction/scattering particle size distribution analyzer. In a case where particle diameters of 0.01 μm or less are included, it is possible to arbitrarily extract 200 or more of the metal oxide microparticles 111 taken in a picture under a transmission electron microscope, measure their respective particle diameters, and calculate their average.

In the present invention, the thickness X (μm) of the insulating layer 117 denotes the distance from the top surface of the barrier layer 114 to the top surface of the insulating layer 117 or, in a case where the top surface of the insulating layer 117 has surface irregularities due to the exterior shape of the metal oxide microparticles 111, to the top end of the metal oxide microparticles 111 which partly protrude from the top surface of the insulating layer 117.

When the value of X/Y given by formula (1) equals 2.5 or less, relative to the average particle diameter of the metal oxide microparticles 111, the thickness of the insulating layer 117 is too small to provide sufficient electrical insulation. So long as the average particle diameter Y of the metal oxide microparticles 111 equals 0.7 μm or less, there is no particular upper limit on the value of X/Y.

The insulating layer 117 is formed by application of a treatment liquid prepared by adding a binder solution to a water solution having the metal oxide microparticles 111 dispersed in it. This allows continuous treatment, requires no process of washing with water, and thus reduces treatment cost.

Since the binder solution contains phosphoric acid, the phosphoric acid chemically dissolves part of the metal oxide microparticles 111 and part of the barrier layer 114. This permits, when moisture has evaporated through drying, the insulating layer 117 to bond to the barrier layer 114.

For the metal oxide microparticles 111, it is possible to use, for example, aluminum oxide, cerium oxide, titanium oxide, tin oxide, or zirconium oxide.

The insulating layer 117 is formed by applying to the surface of the barrier layer 114 a treatment liquid in which the metal oxide microparticles 111 have been dispersed in a binder solution, and then drying it. The treatment liquid is prepared by adding the binder solution to a water solution having the metal oxide microparticles 111 dispersed in it. As the binder solution, it is possible to use, for example, phosphoric acid, condensed phosphoric acid, aluminum phosphate, epoxy resin, or a mixture liquid of those.

Using such a binder solution permits the insulating layer 117 to exhibit improved adhesion to the neighboring resin. It is thus possible to prevent delamination between the insulating layer 117 and the acid-modified polyolefin layer 115. Moreover, using such a binder solution permits the insulating layer 117 to give corrosion resistance to the surface of the barrier layer 114, which is formed of aluminum. Thus, the insulating layer 117 prevents the aluminum surface from being corroded by hydrogen fluoride produced by reaction between electrolyte liquid and moisture.

The insulating layer 117 can be formed by applying the treatment liquid having the metal oxide microparticles dispersed in the binder solution, by an application method selected from well-known ones, such as bar-coating, roll-coating, gravure-coating, and immersion. Forming the insulating layer 117 by application allows continuous treatment, requires no process of washing with water, and thus reduces treatment cost.

Before the insulating layer 117 is formed, it is preferable to perform, beforehand, degreasing treatment on the surface of the barrier layer 114 by a well-known degreasing method, such as alkali immersion, electrolytic washing, acid washing, or acid activation. This improves the adhesion (wettability) on the surface of the barrier layer 114, and makes it possible to stack the metal oxide microparticles 111 evenly, and to farm the insulating layer 117 with an even thickness.

According to this embodiment, the metal oxide microparticles 111 contained in the insulating layer 117 are a material excellent in heat resistance, firm, and highly insulating, and are unlikely to melt or yield under heat or pressure during heat-sealing. Thus, in a case where the cathode tab 123a or the anode tab 123b has a burr, or electrode active material or fine-particle metal foreign matter has splashed onto or otherwise reached and adhered to the inner surface of the thermally adhesive layer 116, even if the burr, electrode active material, or fine-particle metal foreign matter bites into the thermally adhesive layer 116, such foreign matter is hampered by the insulating layer 117 having the metal oxide microparticles 111 stacked on it, and is unlikely to reach the metal foil of the barrier layer 114. Thus, deterioration of electrical insulation is prevented. In this way, it is possible to prevent short-circuiting between the cathode tab 123a or anode tab 123b and the barrier layer 114 via the lithium-ion cell module 122 including the electrolyte liquid inside the packaging member 120.

Moreover, the metal oxide microparticles 111 with an average particle diameter of 0.7 μm or less are stacked to form the insulating layer 117. Let the thickness of the insulating layer 117 be X (μm), and let the average particle diameter of the metal oxide microparticles 111 be Y (μm). Then, by fulfilling formula (1) below, it is possible keeps small the gaps left between neighboring metal oxide microparticles 111, and thereby to increase the volume occupation factor of the metal oxide microparticles 111 contained in the insulating layer 117. This helps further improve the electrical insulation of the insulating layer 117.

[Formula 1]

$$\frac{X}{Y} > 2.5 \quad (1)$$

Moreover, the insulating layer 117 is formed by applying a treatment liquid prepared by adding a binder solution to a water solution having the metal oxide microparticles 111 dispersed in it. This allows continuous treatment, requires no process of washing with water, and thus reduces treatment cost Moreover, the binder solution contains phosphoric acid, and the phosphoric acid chemically dissolves part of the metal oxide microparticles 111. This permits, when moisture has evaporated through drying, the insulating layer 117 to bond to the neighboring barrier layer 114.

Moreover, by giving the insulating layer 117 a thickness of 2 μm or less, it is possible to secure sufficient electrical insulation in the insulating layer 117, and to obtain sufficient formability.

Fourth Embodiment

Figure 7:
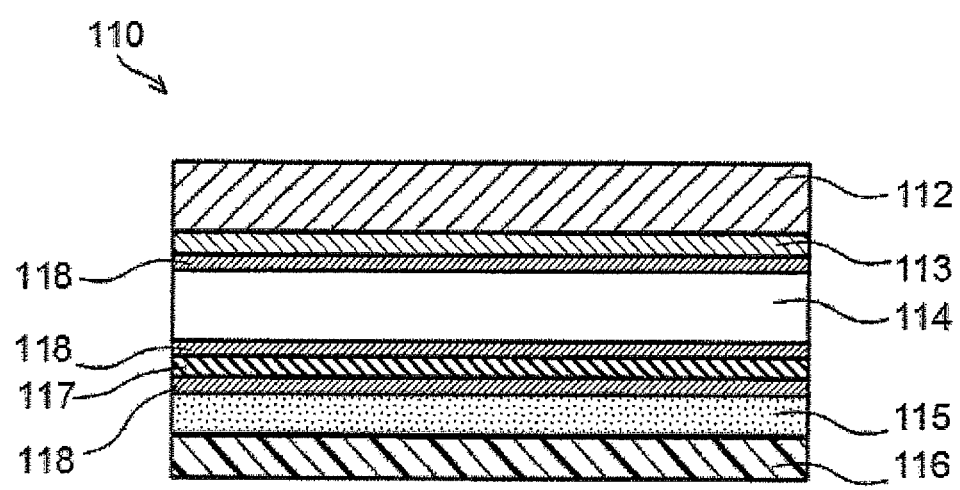
FIG. 7 is a schematic sectional view showing a layer structure of an electrochemical cell packaging material according to a fourth embodiment of the present invention.

FIG. 7 is a sectional view showing a packaging material 110 according to a fourth embodiment of the present invention. For the sake of convenience of description, such features as find their counterparts in the first embodiment shown in FIGS. 1 to 3 described above and in the third embodiment shown in FIG. 5 described above are identified by common reference signs. In the packaging material 110 according to this embodiment, chemical conversion treatment layers 118 are provided one on each side of the barrier layer 114 and one on the thermally adhesive layer 116-side surface of the insulating layer 117.

The chemical conversion treatment layers 118 are acid-resistant coatings formed on the surface of the barrier layer 114 and on the insulating layer 117 having metal oxide microparticles 111 stacked on it. Providing the chemical conversion treatment layers 118 improves the corrosion resistance of the barrier layer 114 and the insulating layer 117, and increases their lamination strength with the neighboring resin layer.

The chemical conversion treatment layers 118 are formed by non-chromium-based chemical conversion treatment or by chromium-based chemical conversion treatment. Examples of non-chromium-based chemical conversion treatment include treatment using zirconium, titanium, or zinc phosphate. Examples of chromium-based chemical conversion treatment include chromic acid chromating treatment, phosphoric acid chromating treatment, and chromating treatment using aminated phenol polymer.

Chromic acid chromating treatment is performed using a chromic acid compound such as chromium nitrate, chromium fluoride, chromium sulfate, chromium acetate, chromium oxalate, chromium biphosphate, acetylacetate chromate, chromium chloride, or potassium chromium sulfate.

Phosphoric acid chromating treatment is performed using a phosphoric acid compound such as sodium phosphate, potassium phosphate, ammonium phosphate, and polyphosphoric acid.

Chromating treatment using aminated phenol polymer is performed using an aminated phenol polymer composed of repeated units represented by general formulae (1) to (4) below.

[Chemical Formula 1]

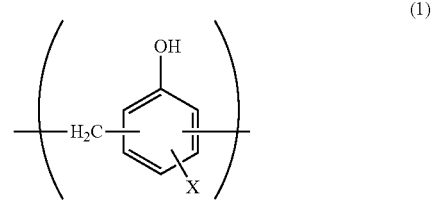

(1)

[Chemical Formula 2]

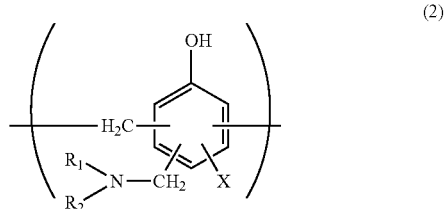

(2)

[Chemical Formula 3]

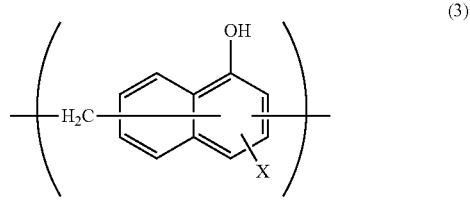

(3)

-continued

[Chemical Formula 4]

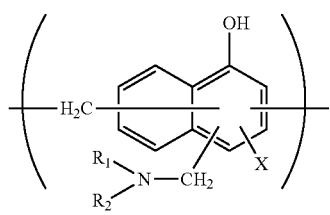

(4)

In formulae 1 to 4, X represents a hydrogen atom, hydroxyl group, alkyl group, hydroxyalkyl group, aryl group, or benzyl group; R1 and R2 each represent a hydroxyl group, alkyl group, or hydroxyalkyl group. R1 and R2 may be identical.

In formulae 1 to 4, examples of alkyl groups represented by X, R1, and R2 include straight-chain or branched alkyl groups with carbon numbers of 1 to 4, including methyl group, ethyl group, n-propyl group, isopropyl group, n-butyl group, isobutyl group, and tert-butyl group.

Examples of hydroxyalkyl groups represented by X, R1, and R2 include straight-chain or branched alkyl groups with carbon numbers of 1 to 4 containing one substituent hydroxyl group, including hydroxymethyl group, 1-hydroxyethyl group, 2-hydroxyethyl group, 1-hydroxylpropyl group, 2-hydroxylpropyl group, 3-hydroxylpropyl group, 1-hydroxylbutyl group, 2-hydroxylbutyl group, 3-hydroxylbutyl group, and 4-hydroxylbutyl group.

It is preferable that the aminated phenol polymer composed of repeated units represented by formulae (1) to (4) have a number average molecular weight of, for example, about 500 to about 1,000,000, more preferably about 1,000 to about 20,000.

The chemical conversion treatment may consist of a single type of chemical conversion treatment alone or a combination of two or more types of chemical conversion treatment. The chemical conversion treatment may be performed using a single compound alone or a combination of two or more compounds. Among different patterns, chromic acid chromating treatment is preferable, and chromating treatment using a combination of a chromic acid compound, a phosphoric acid compound, and an aminated phenol polymer is particularly preferable.

There is no particular restriction on the amount of acid-resistant coating formed on the surface of the barrier layer 114 and the insulating layer 117 by chemical conversion treatment. However, in a case where the chemical conversion treatment is performed using a combination of a chromic acid compound, a phosphoric acid compound, and an aminated phenol polymer, it is preferable that, per 1 m$^2$ of the surface of the metal layer, about 0.5 mg to about 50 mg, more preferably about 1.0 mg to about 40 mg, of a chromic acid compound in chromium equivalent, be contained; about 0.5 mg to about 50 mg, more preferably about 1.0 mg to about 40 mg, of a phosphoric acid compound in phosphorous equivalent be contained; and about 1 mg to about 200 mg, more preferably about 5.0 mg to about 150 mg, of an aminated phenol polymer be contained.

The chemical conversion treatment is performed by applying to the surface of the barrier layer 114 or the insulating layer 117 a solution containing the compounds used to form an acid-resistant coating, by a method such as bar-coating, roll-coating, gravure coating, or immersion, and then heating such that the temperature of the barrier layer 114 is about 70° C. to 200° C. Before the chemical conversion treatment is applied to the barrier layer 114, it is preferable to perform, beforehand, degreasing treatment on the barrier layer 114 by a well-known degreasing method, such as alkali immersion, electrolytic washing, acid washing, or acid activation. Performing such degreasing treatment makes it possible to perform the chemical conversion treatment on the surface of the barrier layer 114 more efficiently.

According to this embodiment, chromium-based chemical conversion treatment or non-chromium-based chemical conversion treatment is applied to the thermally adhesive layer 116-side surface of the insulating layer 117. This improves the corrosion resistance and adhesion (wettability) of the insulating layer 117, and improves the lamination strength between the insulating layer 117 and the neighboring layer.

In the embodiment described above, between adjacent ones of the above-mentioned layers, a different layer may be interposed. Any of the chemical conversion treatment layers 118 may be omitted. Although a lithium-ion cell 121 has been dealt with above, any electrochemical cell module other than a lithium-ion cell module 122 may be packaged in the packaging member 120 formed of the packaging material 110 to fabricate an electrochemical cell other than a lithium-ion cell 121.

Example 1

With respect to electrochemical cell packaging materials 110 of Practical Examples 1 and 2 according to the first and second embodiments and an electrochemical cell packaging material of Comparison Example 1, corrosion resistance and electrical insulation were evaluated.

In an electrochemical cell packaging material 110 of Practical Example 1, chemical conversion treatment was applied to both surfaces of aluminum (with a thickness of 40 μm), and to one chemical-conversion-treated surface, a drawn nylon film (with a thickness of 25 μm) was bonded by dry lamination via a two-component-curing-type polyurethane-based adhesive. Subsequently, to the other chemical-conversion-treated surface, acid-modified polypropylene (with a thickness of 23 μm, hereinafter abbreviated to acid-modified PP) and polypropylene (with a thickness of 23 μm, hereinafter abbreviated to PP) were laminated by co-extrusion.

Here, the chemical conversion treatment was performed using a treatment liquid which was a mixture liquid of alumina particles with an average particle diameter of 0.2 μm, phosphoric acid, and a resin component (aminated phenol and modified epoxy resin in the ratio of 1:1). The treatment liquid was applied by roll-coating, and was baked for two minutes under such conditions that the coating temperature was 190° C. The amount of treatment liquid applied was 1 g/m$^2$ (by dry weight), and the chemical conversion treatment layer 114a was formed to have a thickness of 1 μm after drying.

In this way, an electrochemical cell packaging material 110 of Practical Example 1 was obtained which had the structure: drawn nylon film as base material layer 112/two-component-curing-type polyurethane-based adhesive as adhesive layer 113/chemical conversion treatment layer 114a/aluminum as barrier layer 114/chemical conversion treatment layer 114a/acid-modified PP as acid-modified polyolefin layer 115/PP as thermally adhesive layer 116.

Example 2

In an electrochemical cell packaging material 110 of Practical Example 2, chemical conversion treatment was applied to both surface of aluminum (with a thickness of 40 µm), and to one chemical-conversion-treated surface, a drawn nylon film (with a thickness of 25 µm) was bonded by dry lamination via a two-component-curing-type polyurethane-based adhesive. Subsequently, to the other chemical-conversion-treated surface, acid-modified polypropylene (with a thickness of 23 µm, hereinafter abbreviated to acid-modified PP) and polypropylene (with a thickness of 23 µm, hereinafter abbreviated to PP) were laminated by co-extrusion.

Here, the chemical conversion treatment was performed using a treatment liquid which was a mixture liquid of alumina particles with an average particle diameter of 0.2 µm, phosphoric acid, and a resin component (modified epoxy resin). The treatment liquid was applied by roll-coating, and was baked for two minutes under such conditions that the coating temperature was 190° C. The amount of treatment liquid applied was 1 g/m$^2$ (by dry weight), and the chemical conversion treatment layer 114a was formed to have a thickness of 1 µm after drying.

In this way, an electrochemical cell packaging material 110 of Practical Example 2 was obtained which had the structure: drawn nylon film as base material layer 112/two-component-curing-type polyurethane-based adhesive as adhesive layer 113/chemical conversion treatment layer 114a/aluminum as barrier layer 114/chemical conversion treatment layer 114a/acid-modified PP as acid-modified polyolefin layer 115/PP as thermally adhesive layer 116.

Comparison Example 1

In an electrochemical cell packaging material 110 of Comparison Example 1, chemical conversion treatment was applied to both surfaces of aluminum (with a thickness of 40 µm), and to one chemical-conversion-treated surface, a drawn nylon film (with a thickness of 25 µm) was bonded by dry lamination via a two-component-curing-type polyurethane-based adhesive. Subsequently, to the other chemical-conversion-treated surface, acid-modified polypropylene (with a thickness of 23 µm, hereinafter abbreviated to acid-modified PP) and polypropylene (with a thickness of 23 µm, hereinafter abbreviated to PP) were laminated by co-extrusion.

Here, the chemical conversion treatment was performed using a treatment liquid which was a mixture liquid of alumina particles with an average particle diameter of 0.2 µm, phosphoric acid, and a resin component (aminated phenol). The treatment liquid was applied by roll-coating, and was baked for two minutes under such conditions that the coating temperature was 190° C. The amount of treatment liquid applied was 1 g/m$^2$ (by dry weight), and the chemical conversion treatment layer 114a was formed to have a thickness of 1 µm after drying.

In this way, an electrochemical cell packaging material 110 of Comparison Example 1 was obtained which had the structure: drawn nylon film as base material layer/two-component-curing-type polyurethane-based adhesive as adhesive layer/chemical conversion treatment layer/aluminum as barrier layer/chemical conversion treatment layer/acid-modified PP as acid-modified polyolefin layer/PP as thermally adhesive layer.

Corrosion resistance was evaluated in the following manner: for each of Practical Example 1, Practical Example 2, and Comparison Example 1, the packaging material was cut into strips sized 15 mm×100 mm, which were then kept immersed in electrolyte liquid (a liquid composed of ethylene carbonate, diethyl carbonate, and dimethyl carbonate in the ratio of 1:1:1 with 1 mol of hexafluorophosphate added to it) at 85° C. for two weeks.

From the packaging material after the immersion, part of the PP as the rmally adhesive layer was peeled off; then, on a tensile strength tester (AGS-50D model manufactured by Shimazdu Corporation), the PP thus peeled off was further peeled off the packaging material in the longitudinal direction at a speed of 50 mm/minute to measure the strength during peeling. This was performed with five samples, and the average was taken as the lamination strength (N/15 mm). Here, when the lamination strength was greater than 5 N/15 mm, resistance to electrolyte liquid was evaluated as excellent (OK); when the lamination strength was smaller than 5 N/15 mm, resistance to electrolyte liquid was evaluated as poor (NG). The results are shown in Table 1.

Electrical insulation was evaluated in the following manner: for each of Practical Example 1, Practical Example 2, and Comparison Example 1, the packaging material was cut into strips sized 15 mm×100 mm; then a nickel tab (4 mm×30 mm) sprinkled with carbon particles with an average particle diameter of 44 µm and PP as a packaging material were put in contact with the surface and were heat-sealed under pressure (0.2 MPa, 190° C.) applied by a heat-sealing bar (with a width of 30 mm).

Here, the heat-sealing was continued until, under the pressure of the heat-sealing bar, the carbon particles bit into the acid-modified PP and the PP and the resistance between the nickel tab and the aluminum of the packaging material became 100Ω or less under a voltage of 25 V, and the time that elapsed was measured. This was performed with five samples, and the average was taken as the insulation deterioration time (seconds). When the insulation deterioration time was 100 seconds or more, electrical insulation was evaluated as excellent (OK); when the insulation deterioration time was 20 seconds or more but less than 100 seconds, electrical insulation was evaluated as moderate (MID); when the insulation deterioration time was less than 20 seconds, electrical insulation was evaluated as poor (NG). The results are shown in Table 1.

TABLE 1

|  | Corrosion Resistance | Electrical Insulation |
| --- | --- | --- |
| Practical Example 1 | OK | OK |
| Practical Example 2 | OK | OK |
| Comparison Example 1 | OK | NG |

As shown in Table 1, the packaging materials of Practical Example 1, Practical Example 2, and Comparison Example 1 were all excellent in resistance to corrosion by electrolyte liquid (OK). The packaging materials after the immersion were inspected visually, and no separation resulting from delamination between aluminum and a resin layer was observed in any of Practical Example 1, Practical Example 2, and Comparison Example. The packaging materials of Practical Example 1 and Practical Example 2 were excellent in electrical insulation (OK); in contrast, the packaging material of Comparison Example 1 was poor in electrical insulation (NG).

Example 3

With respect to electrochemical cell packaging materials 110 of Practical Examples 3 to 9 according to the third and fourth embodiments and electrochemical cell packaging materials of Comparison Examples 2 to 6, electrical insulation, lamination strength, and formability were evaluated.

[Fabrication of Samples of Electrochemical Cell Packaging Materials]

In an electrochemical cell packaging material 110 of Practical Example 3, a treatment liquid prepared by adding a binder solution to a water solution having metal oxide microparticles 111 dispersed in it was applied to both surfaces of aluminum (with a thickness of 35 µm) as a barrier layer 114, and was then dried to form an insulating layer 117 with a thickness of 1 µm. Used as the metal oxide microparticles 111 here was aluminum oxide with an average particle diameter of 0.01 µm (the average particle diameter was calculated by measuring the size of the metal oxide microparticles in a picture taken under a transmission electron microscope). The treatment liquid had the metal oxide microparticles 111 dispersed in the water solution at a concentration by weight of 30% such that, for 10 parts by weight of the water solution having the metal oxide microparticles 111 dispersed in it, the binder solution contained 0.9 parts of phosphoric acid and 0.1 parts of other resins. Subsequently, a drawn nylon film (with a thickness of 15 µm) as a base material layer 112 was bonded by dry lamination via a two-component-curing-type polyurethane-based adhesive, and then, on the top surface of an insulating layer 117, acid-modified polypropylene (with a thickness of 20 µm) and polypropylene (with a thickness of 15 µm) were laminated by melt co-extrusion to form an acid-modified polyolefin layer 115 and a thermally adhesive layer 116.

Example 4

An electrochemical cell packaging material 110 of Practical Example 4 had the same layer structure as the electrochemical cell packaging material 110 of Practical Example 3 except for the insulating layer 117. In the electrochemical cell packaging material 110 of Practical Example 4, the insulating layer 117 was formed using aluminum oxide with an average particle diameter of 0.01 µm to have a thickness of 2 µm.

Example 5

An electrochemical cell packaging material 110 of Practical Example 5 had the same layer structure as the electrochemical cell packaging material 110 of Practical Example 3 except for the insulating layer 117. In the electrochemical cell packaging material 110 of Practical Example 5, the insulating layer 117 was formed using aluminum oxide with an average particle diameter of 0.01 µm to have a thickness of 3 µm.

Example 6

An electrochemical cell packaging material 110 of Practical Example 6 had the same layer structure as the electrochemical cell packaging material 110 of Practical Example 3 except for the insulating layer 117. In the electrochemical cell packaging material 110 of Practical Example 6, the insulating layer 117 was formed using aluminum oxide with an average particle diameter of 0.3 µm to have a thickness of 1 µm. Incidentally, the average particle diameter of aluminum oxide was measured on a laser-diffraction/scattering particle size distribution analyzer (LA920 model manufactured by Horiba Ltd.).

Example 7

An electrochemical cell packaging material 110 of Practical Example 7 had the same layer structure as the electrochemical cell packaging material 110 of Practical Example 3 except for the insulating layer 117. In the electrochemical cell packaging material 110 of Practical Example 7, the insulating layer 117 was formed using aluminum oxide with an average particle diameter of 0.3 µm to have a thickness of 2 µm. Incidentally, the average particle diameter of aluminum oxide was measured on a laser-diffraction/scattering particle size distribution analyzer (LA920 model manufactured by Horiba Ltd.).

Example 8

An electrochemical cell packaging material 110 of Practical Example 8 had the same layer structure as the electrochemical cell packaging material 110 of Practical Example 3 except for the insulating layer 117. In the electrochemical cell packaging material 110 of Practical Example 8, the insulating layer 117 was formed using aluminum oxide with an average particle diameter of 0.7 µm to have a thickness of 2 µm. Incidentally, the average particle diameter of aluminum oxide was measured on a laser-diffraction/scattering particle size distribution analyzer (LA920 model manufactured by Horiba Ltd.).

Example 9

In an electrochemical cell packaging material 110 of Practical Example 9, as distinct from the electrochemical cell packaging material 110 of Practical Example 3, a chemical conversion treatment layer 118 is provided on the top surface of the insulating layer 117. The chemical conversion treatment was performed by applying a treatment liquid composed of phenol resin, a chromium fluoride compound, and phosphoric acid by roll-coating, and baking it under such conditions that the coating temperature was 180° C. or more. Here, the amount of chromium applied was 10 mg/m$^2$ (by dry weight).

Comparison Example 2

In an electrochemical cell packaging material of Comparison Example 2, no insulating layer 117 as in Practical Example 3 was provided. That is, chemical conversion treatment layers 118 were provided one on each surface of aluminum (with a thickness of 40 µm) as a barrier layer; to one surface, a drawn nylon film as a base material layer 112 was bonded by dry lamination via two-component-curing-type polyurethane-based adhesive; and on the other surface, acid-modified polypropylene (with a thickness of 20 µm) and polypropylene (with a thickness of 15 µm) were laminated by melt co-extrusion to form an acid-modified polyolefin layer and a thermally adhesive layer. The chemical conversion treatment was performed in the same manner as in Practical Example 9.

Comparison Example 3

An electrochemical cell packaging material of Comparison Example 3 had the same layer structure as the electrochemical cell packaging material of Practical Example 3 except for the insulating layer. In the electrochemical cell packaging material of Comparison Example 3, the insulating layer was formed using aluminum oxide with an average particle diameter of 1.0 µm to have a thickness of 1 µm. Incidentally, the average particle diameter of aluminum oxide was measured on a laser-diffraction/scattering particle size distribution analyzer (LA920 model manufactured by Horiba Ltd.).

Comparison Example 4

An electrochemical cell packaging material of Comparison Example 4 had the same layer structure as the electrochemical cell packaging material of Practical Example 3 except for the insulating layer. In the electrochemical cell packaging material of Comparison Example 4, the insulating layer was formed using aluminum oxide with an average particle diameter of 1.0 μm to have a thickness of 2 μm. Incidentally, the average particle diameter of aluminum oxide was measured on a laser-diffraction/scattering particle size distribution analyzer (LA920 model manufactured by Horiba Ltd.).

Comparison Example 5

An electrochemical cell packaging material of Comparison Example 5 had the same layer structure as the electrochemical cell packaging material of Practical Example 3 except for the insulating layer. In the electrochemical cell packaging material of Comparison Example 5, the insulating layer was formed using aluminum oxide with an average particle diameter of 0.01 μm to have a thickness of 5 μm. Incidentally, the average particle diameter of aluminum oxide was calculated by measuring the size of the metal oxide microparticles in a picture taken under a transmission electron microscope.

Comparison Example 6

An electrochemical cell packaging material of Comparison Example 6 had the same layer structure as the electrochemical cell packaging material of Practical Example 3 except for the insulating layer. In the electrochemical cell packaging material of Comparison Example 6, the insulating layer was formed using aluminum oxide with an average particle diameter of 0.7 μm to have a thickness of 1 μm. Incidentally, the average particle diameter of aluminum oxide was measured on a laser-diffraction/scattering particle size distribution analyzer (LA920 model manufactured by Horiba Ltd.).

[Evaluation of Electrical Insulation]

Electrical insulation was evaluated in the following manner: for each of Practical Examples 3 to 9 and Comparison Examples 2 to 6, the packaging material was cut into strips sized 40 mm×120 mm; then an aluminum tab (30 mm×100 mm) and the polypropylene-side surface of the packaging material were brought into contact with each other with a wire (with an inner diameter of 25.4 μm) held in between, and heat-sealing was performed at 190° C. under a heat-sealing pressure of 1.0 MPa exerted by a heat-sealing bar (with a width of 30 mm).

Here, the time was measured that elapsed before, under the pressure of the heat-sealing bar, the wire bit into the acid-modified polypropylene and the polypropylene and electrical insulation between the aluminum tab and the aluminum of the packaging material deteriorated. The results are shown in Table 2. The insulation deterioration time denotes the time (seconds) that elapsed before the resistance became 100 MΩ or less when a voltage of 100 V was kept applied between the aluminum tab and the aluminum of the packaging material after the start of the heat-sealing.

TABLE 2

|  | Time (Seconds) Before Short-Circuiting Occurred |
|---|---|
| Practical Example 3 | 60.0 |
| Practical Example 4 | 60.0 |
| Practical Example 5 | 60.0 |
| Practical Example 6 | 60.0 |
| Practical Example 7 | 60.0 |
| Practical Example 8 | 60.0 |
| Practical Example 9 | 60.0 |
| Comparison Example 2 | 6.2 |
| Comparison Example 3 | 6.0 |
| Comparison Example 4 | 34.9 |
| Comparison Example 5 | 60.0 |
| Comparison Example 6 | 4.0 |

As shown in Table 2, with the packaging materials of Practical Examples 3 to 9, no short-circuiting occurred even at the lapse of 60 seconds. This indicates that the packaging materials of Practical Examples 3 to 9 are superior in electrical insulation to that of Comparison Example 2, where no insulating layer 117 was formed, or those of Comparison Examples 3 and 4, where the insulating layer was formed using aluminum oxide with an average particle diameter of 0.7 μm or more.

[Evaluation of Corrosion Resistance]

For each of Practical Examples 3 to 9 and Comparison Examples 2 to 6, corrosion resistance was evaluated by comparing the lamination strength between the barrier layer 114 and the acid-modified polyolefin layer 115 before and after immersion of the electrochemical cell packaging material in electrolyte liquid.

First, for each of Practical Examples 3 to 9 and Comparison Examples 2 to 6, the electrochemical cell packaging material was cut into a pair of strips sized 150 mm×250 mm; one of the strips was then kept immersed for 24 hours in electrolyte liquid (a liquid composed of ethylene carbonate, diethyl carbonate, and dimethyl carbonate in the ratio of 1:1:1 with 1 mol of hexafluorophosphate added to it) at 85° C.

Next, with each of the strip that was immersed in the electrolyte liquid and the strip that was not, on a tensile strength tester (AGS-50D model manufactured by Shimazdu Corporation), the aluminum as the barrier layer 114 and the acid-modified polypropylene as the acid-modified polyolefin layer 115 were peeled off each other in the longitudinal direction at the speed of 50 mm/minute. Meanwhile, the strength of peeling was measured and taken as the lamination strength (N/15 mm) between the barrier layer 114 and the acid-modified polyolefin layer 115. The results are shown in Table 3.

TABLE 3

|  | Lamination Strength (N/15 mm) | |
|---|---|---|
|  | Before Immersion in Electrolyte Liquid | After Immersion in Electrolyte Liquid |
| Practical Example 3 | 8.2 | 8.3 |
| Practical Example 4 | 8.6 | 8.5 |
| Practical Example 5 | 8.2 | 8.3 |
| Practical Example 6 | 8.4 | 8.5 |
| Practical Example 7 | 8.7 | 8.2 |
| Practical Example 8 | 8.3 | 8.0 |
| Practical Example 9 | 8.8 | 8.9 |
| Comparison Example 2 | 7.9 | 8.1 |
| Comparison Example 3 | 8.3 | 8.6 |
| Comparison Example 4 | 8.1 | 7.9 |

TABLE 3-continued

| | Lamination Strength (N/15 mm) | |
|---|---|---|
| | Before Immersion in Electrolyte Liquid | After Immersion in Electrolyte Liquid |
| Comparison Example 5 | 7.7 | 7.8 |
| Comparison Example 6 | 8.1 | 8.9 |

As shown in Table 3, with the electrochemical cell packaging materials of Practical Examples 3 to 9, no significant lowering of lamination strength was observed after immersion in electrolyte liquid.

[Evaluation of Formability]

Formability was evaluated in the following manner: for each of Practical Examples 3 to 9 and Comparison Examples 2, 5, and 6, the electrochemical cell packaging material was cut into five pieces sized 80 mm×120 mm; these were then cold-formed to have a depth of 5.0 mm at 0.1 MPa using a mold (concave) with an opening sized 35 mm×50 mm and a corresponding mold (convex), and how many of them developed a pinhole in the thermally adhesive layer 116-side surface of the packaging material was inspected visually. The results are shown in Table 4.

TABLE 4

| | Formability |
|---|---|
| Practical Example 3 | OK |
| Practical Example 4 | OK |
| Practical Example 5 | MID |
| Practical Example 6 | OK |
| Practical Example 7 | OK |
| Practical Example 8 | OK |
| Practical Example 9 | OK |
| Comparison Example 2 | OK |
| Comparison Example 3 | — |
| Comparison Example 4 | — |
| Comparison Example 5 | NG |
| Comparison Example 6 | OK |

As shown in Table 4, with the electrochemical cell packaging materials of Practical Examples 3, 4, and 6 to 9, no pinholes were observed in any of the five pieces (OK). With the electrochemical cell packaging material of Practical Example 5, pinholes were observed only in one of the five pieces (MID). With the electrochemical cell packaging material of Comparison Example 5, pinholes were observed in four of the five pieces (NG).

INDUSTRIAL APPLICABILITY

The present invention finds application as packaging materials for packaging chemical cells such as nickel-hydride cells, nickel-cadmium cells, lithium-metal primary or secondary cells, and lithium-polymer cells, electric double-layer capacitors, capacitors, and electrolytic capacitors.

LIST OF REFERENCE SIGNS 110 packaging material
111 metal oxide microparticles
112 base material layer
113 adhesive layer
114 barrier layer
114a chemical conversion treatment layer
114b insulating layer
115 acid-modified polyolefin layer
116 thermally adhesive layer
117 insulating layer
118 chemical conversion treatment layer
120 packaging member
120a housing portion
120b lid portion
121 lithium-ion cell
122 lithium-ion cell module
123a cathode tab
123b anode tab

The invention claimed is:

1. An electrochemical cell packaging material comprising, as layers laminated together, at least:
a base material layer formed of a resin film;
a thermally adhesive layer arranged as an innermost layer and formed of a thermally adhesive resin; and
a barrier layer arranged between the base material layer and the thermally adhesive layer and formed of a metal foil,
wherein
a chemical conversion treatment layer containing alumina particles having an average particle diameter of 0.03 µm to 3.0 µm, phosphoric acid, and a modified epoxy resin is directly formed at least on one surface of the barrier layer such that the at least one surface on which the chemical conversion treatment layer is directly formed includes a surface of the barrier layer facing the thermally adhesive layer,
on the chemical conversion treatment layer directly formed on the surface of the barrier layer facing the thermally adhesive layer, an insulating layer containing a modified epoxy resin is laminated, and
the insulating layer and the thermally adhesive layer are bonded together via an acid-modified polyolefin resin, the insulating layer being capable of suppressing a lowering of laminate strength with respect to the acid-modified polyolefin resin more effectively than the chemical conversion treatment layer.

2. The electrochemical cell packaging material according to claim 1,
wherein the insulating layer has a thickness of 0.5 µm or more but 5 µm or less.

3. The electrochemical cell packaging material according to claim 2,
wherein the thickness of the insulating layer is greater than the average particle diameter of the alumina particles.

4. The electrochemical cell packaging material according to claim 1,
wherein the thickness of the insulating layer is greater than the average particle diameter of the alumina particles.

5. The electrochemical cell packaging material according to claim 4,
wherein the insulating layer has a thickness of 2 µm or less.

6. The electrochemical cell packaging material according to claim 4,
wherein chromium-based or non-chromium-based chemical conversion treatment is applied to the surface of the barrier layer facing the thermally adhesive layer.

7. The electrochemical cell packaging material according to claim 1,
wherein the modified epoxy resin of the chemical conversion treatment layer is a modified product of an epoxy resin comprising bisphenol A or bisphenol F skeletal units.

8. The electrochemical cell packaging material according to claim 1,
wherein the modified epoxy resin of the chemical conversion treatment layer comprises a phosphoric acid-modified product of an epoxy resin in which part of or all glycidyl groups in the epoxy resin are phosphoric acid-modified.

9. An electrochemical cell packaging material comprising, as layers laminated together, at least:
a base material layer formed of a resin film;
a thermally adhesive layer arranged as an innermost layer and formed of a thermally adhesive resin; and
a barrier layer arranged between the base material layer and the thermally adhesive layer and formed of a metal foil,
wherein
a chemical conversion treatment layer containing alumina particles having an average particle diameter of 0.03 µm to 3.0 µm, phosphoric acid, and a modified epoxy resin is directly formed at least on one surface of the barrier layer such that the at least one surface on which the chemical conversion treatment layer is directly formed includes a surface of the barrier layer facing the thermally adhesive layer, and
on the chemical conversion treatment layer directly formed on the surface of the barrier layer facing the thermally adhesive layer, an insulating layer free of alumina particles and containing a modified epoxy resin is laminated.

10. The electrochemical cell packaging material according to claim 9,
wherein the insulating layer has a thickness of 0.5 µm or more but 5 µm or less.

11. The electrochemical cell packaging material according to claim 10,
wherein the thickness of the insulating layer is greater than the average particle diameter of the alumina particles.

12. The electrochemical cell packaging material according to claim 9,
wherein the thickness of the insulating layer is greater than the average particle diameter of the alumina particles.

13. The electrochemical cell packaging material according to claim 12,
wherein the insulating layer has a thickness of 2 µm or less.

14. The electrochemical cell packaging material according to claim 12,
wherein chromium-based or non-chromium-based chemical conversion treatment is applied to the surface of the barrier layer facing the thermally adhesive layer.

15. The electrochemical cell packaging material according to claim 9,
wherein the chemical conversion treatment layer is directly formed on each of the surface of the barrier layer facing the thermally adhesive layer and a surface of the barrier layer facing the base material layer.

16. The electrochemical cell packaging material according to claim 9,
wherein the modified epoxy resin of the chemical conversion treatment layer is a modified product of an epoxy resin comprising bisphenol A or bisphenol F skeletal units.

17. The electrochemical cell packaging material according to claim 9,
wherein the modified epoxy resin of the chemical conversion treatment layer comprises a phosphoric acid-modified product of an epoxy resin in which part of or all glycidyl groups in the epoxy resin are phosphoric acid-modified.

* * * * *